US009777122B2

(12) United States Patent
O'Brien et al.

(10) Patent No.: US 9,777,122 B2
(45) Date of Patent: Oct. 3, 2017

(54) THICKENING COMPOSITIONS, AND RELATED MATERIALS AND PROCESSES

(71) Applicants: GENERAL ELECTRIC COMPANY, Schenectady, NY (US); UNIVERSITY OF PITTSBURGH—OF THE COMMONWEALTH SYSTEM OF HIGHER EDUCATION, Pittsburgh, PA (US)

(72) Inventors: Michael Joseph O'Brien, Halfmoon, NY (US); Robert James Perry, Niskayuna, NY (US); Robert Michael Enick, Bethel Park, PA (US); Jason Jiwoo Lee, Pittsburgh, PA (US)

(73) Assignee: General Electric Company, Niskayuna, NY (US)

( * ) Notice: Subject to any disclaimer, the term of this patent is extended or adjusted under 35 U.S.C. 154(b) by 109 days.

(21) Appl. No.: 14/683,599

(22) Filed: Apr. 10, 2015

(65) Prior Publication Data

US 2016/0297934 A1 Oct. 13, 2016

(51) Int. Cl.

| | |
|---|---|
| ***C08G 77/388*** | (2006.01) |
| ***C09K 8/62*** | (2006.01) |
| ***C08G 77/00*** | (2006.01) |
| ***C09K 8/588*** | (2006.01) |
| ***C09K 8/594*** | (2006.01) |
| ***C09K 8/64*** | (2006.01) |
| ***E21B 43/16*** | (2006.01) |
| ***C08L 83/06*** | (2006.01) |
| ***C09K 8/68*** | (2006.01) |
| ***E21B 43/24*** | (2006.01) |

(52) U.S. Cl.

CPC .......... *C08G 77/80* (2013.01); *C08G 77/388* (2013.01); *C08L 83/06* (2013.01); *C09K 8/588* (2013.01); *C09K 8/594* (2013.01); *C09K 8/64* (2013.01); *C09K 8/68* (2013.01); *E21B 43/164* (2013.01); *E21B 43/24* (2013.01); *E21B 43/2405* (2013.01); *Y02P 20/544* (2015.11)

(58) Field of Classification Search

USPC ........................................ 528/10–43

See application file for complete search history.

(56) References Cited

U.S. PATENT DOCUMENTS

| | | | |
|---|---|---|---|
| 5,006,584 A | 4/1991 | Davis | |
| 5,045,220 A | 9/1991 | Harris et al. | |
| 5,080,169 A | 1/1992 | Davis | |
| 5,123,486 A | 6/1992 | Davis | |
| 5,143,632 A | 9/1992 | Woo | |
| 5,414,092 A | 5/1995 | Green et al. | |
| 5,746,779 A | 5/1998 | Brown | |
| 6,054,547 A | 4/2000 | Perry et al. | |
| 7,241,835 B2 | 7/2007 | O'Brien et al. | |
| 8,529,155 B2 | 9/2013 | DiTommaso et al. | |
| 8,747,694 B2 | 6/2014 | Perry et al. | |
| 2010/0192312 A1* | 8/2010 | Cremer | A61K 8/11 8/405 |

FOREIGN PATENT DOCUMENTS

| | | |
|---|---|---|
| JP | 10-239876 | * 9/1998 |
| SU | 1712374 | * 2/1992 |
| WO | WO 2012/018632 | * 2/2012 |

OTHER PUBLICATIONS

Abstract for SU 1712374 (no date).*

Chrastina et al., "Enhanced Oil Recovery: Maximizing Our Petroleum Resources", Session A13—Chemical Engineering Topics 2, pp. 2337, Mar. 2, 2015.

International Search Report and Written Opinion issued in connection with corresponding PCT Application No. PCT/US2016/026595 dated Jun. 29, 2016.

* cited by examiner

*Primary Examiner* — Marc Zimmer
(74) *Attorney, Agent, or Firm* — Pabitra K. Chakrabarti

(57) ABSTRACT

A silicone polymer is provided, modified with at least one functional group from the class of anthraquinone amide groups; anthraquinone sulfonamide groups; thioxanthone amide groups; or thioxanthone sulfone amide groups. The polymer can be combined with a hydrocarbon solvent or with supercritical carbon dioxide ($CO_2$), and is very effective for increasing the viscosity of either medium. A process for the recovery of oil from a subterranean, oil-bearing formation is also described, using supercritical carbon dioxide modified with the functionalized silicone polymer. A process for extracting natural gas or oil from a bedrock-shale formation is also described, again using the modified silicone polymer.

19 Claims, 1 Drawing Sheet

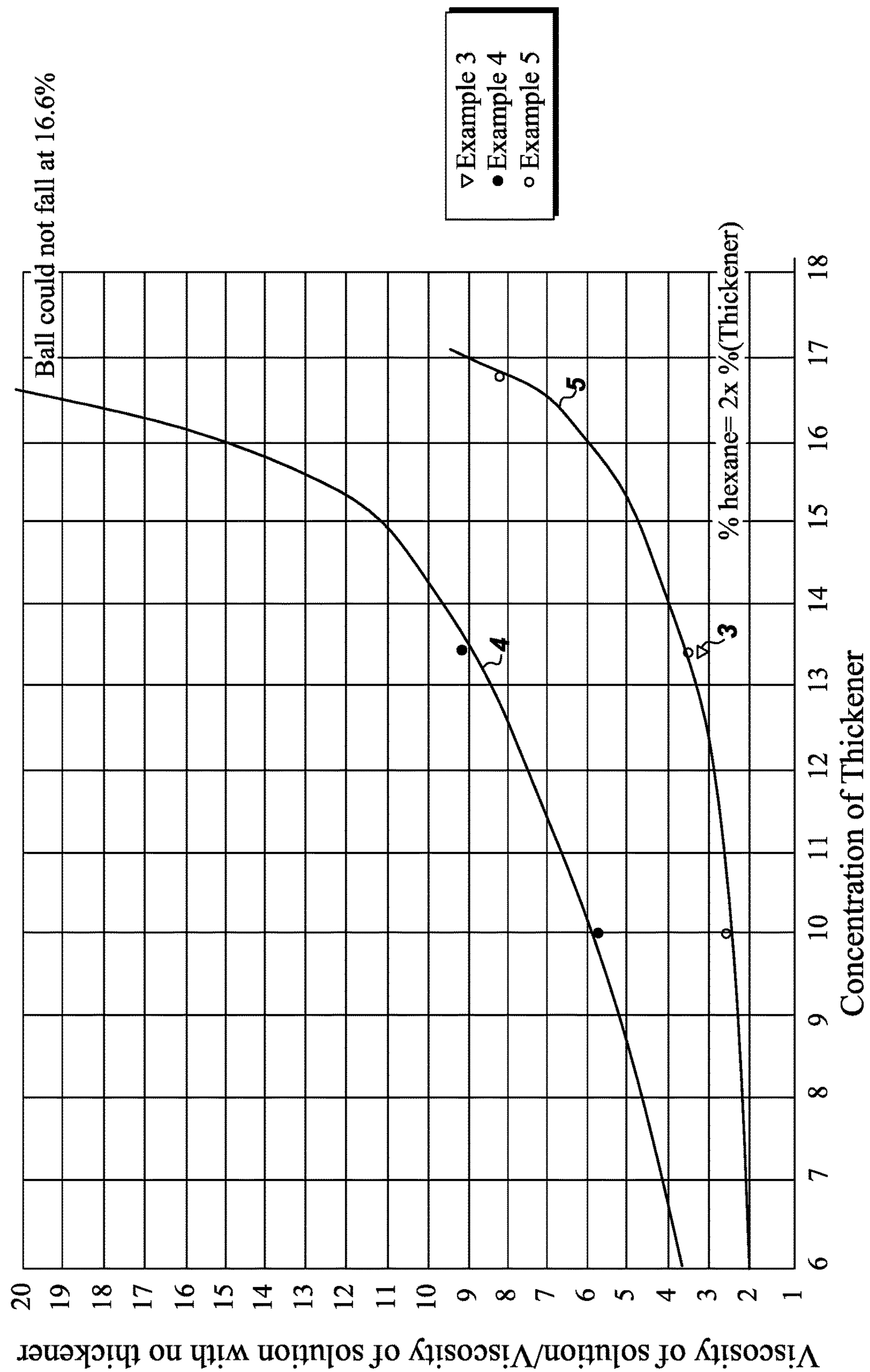
Ball could not fall at 16.6%
▿ Example 3
• Example 4
∘ Example 5
% hexane= 2x %(Thickener)
Concentration of Thickener
Viscosity of solution/Viscosity of solution with no thickener
6
7
8
9
10
11
12
13
14
15
16
17
18
1
2
3
4
5
6
7
8
9
10
11
12
13
14
15
16
17
18
19
20
3
4
5

THICKENING COMPOSITIONS, AND RELATED MATERIALS AND PROCESSES

STATEMENT REGARDING FEDERALLY SPONSORED RESEARCH & DEVELOPMENT

This invention was made with Government support under grant number DE-AR0000292, awarded by the Department of Energy. The Government has certain rights in the invention.

BACKGROUND

Additive compositions that are capable of changing the viscosity of various liquids are of considerable interest for a number of commercial and industrial applications. The viscosity of hydrocarbon solvents such as benzene, hexane, heptane, and cyclopentane can be altered by the addition of various thickening agents, to suit a particular end use application. Moreover, the use of additives for altering the viscosity of supercritical carbon dioxide ($CO_2$) has also become an important objective.

Supercritical $CO_2$ (sometimes referred to herein as simply "$CO_2$") is of great interest as a solvent in chemical processing, because it is non-flammable, relatively non-toxic, and naturally abundant. These properties have prompted the use of $CO_2$ as an organic solvent for polymerization; along with many other applications, such as a solvent in biocatalysis; and as a raw material in chemical synthesis.

Another important application for supercritical $CO_2$ relates to oil recovery from underground formations. In enhanced oil recovery (EOR), a flooding agent is pumped into oil-bearing formations, to move the petroleum to exit wells. Water is a typical flooding agent, but its use has various limitations. For example, water is not a good solvent for oil; and intimate contact between petroleum and water results in cross-contamination that requires the remediation of large volumes of organic-contaminated water.

Supercritical $CO_2$ is a better solvent for oil than water; and would be a more environmentally-sustainable flooding agent than water. However, the viscosity of supercritical $CO_2$ is too low to effectively recover petroleum from the formation. Rather than sweeping the oil before it, $CO_2$ has the tendency to finger its way through the petroleum, bypassing most of the oil. The recovery of oil therefore entails the injection of very large amounts of purchased and recycled $CO_2$, over extended periods of time.

Various techniques have been developed to try to accommodate the low viscosity of supercritical $CO_2$ in an EOR application. One injection of water and supercritical $CO_2$, i.e., the "WAG" process. This example that has been shown to be beneficial on a limited basis involves the formation of $CO_2$ emulsions or foams which decrease the solvent's mobility. Another example is based on the alternate technique can reduce the $CO_2$ saturation, thereby decreasing the $CO_2$'s relative permeability, and increasing its ability to sweep through more of the formation.

While the WAG process is generally recognized by most operators as superior to the continuous injection of $CO_2$, and can make recovery more economical, it still results in most of the oil being left behind in the formation. Moreover, the process introduces operational difficulties, such as the need to produce, separate, process, and re-inject large volumes of water. It also increases the time required to inject the entire $CO_2$ "slug". This in turn can undesirably delay the completion of the overall oil recovery project.

Active research has involved designing additives to raise the viscosity of supercritical $CO_2$, to render the solvent more practical. However, the various additives have often not been entirely satisfactory, for various reasons. As an example, high-molecular weight organic polymers such as those based on copolymers of styrene and fluorinated acrylates do have the ability to thicken the supercritical $CO_2$, but can sometimes be very expensive; and can also be toxic, e.g., if the fluoroacrylate contains a strand of eight fluorinated carbons.

With these concerns in mind, new materials that can beneficially alter the viscosity of hydrocarbons and specialty solvents like supercritical $CO_2$ would be welcome in the art. The materials should be relatively benign to the environment; and economical to make and use. The materials should also be very compatible with both EOR processes, as well as other oil and petroleum extraction techniques, such as hydraulic fracturing.

BRIEF DESCRIPTION OF THE INVENTION

One embodiment of the invention is directed to a silicone polymer that comprises at least one functional group selected from anthraquinone amide groups; anthraquinone sulfonamide groups; thioxanthone amide groups; or thioxanthone sulfone amide groups.

Another embodiment relates to the functionalized silicone polymer described herein, in combination with a hydrocarbon solvent containing about 2 to 20 carbon atoms (and preferably, about 4 to about 20 carbon atoms). The functionalized silicone polymer can also be combined with supercritical carbon dioxide ($CO_2$).

A thickening agent for organic liquid compositions or supercritical fluids, or mixtures thereof, is also an embodiment of this invention. The thickening agent is a silicone polymer that contains at least one functional group selected from anthraquinone amide groups; anthraquinone sulfonamide groups; thioxanthone amide groups; or thioxanthone sulfone amide groups.

A process for increasing the viscosity of supercritical $CO_2$ or increasing the viscosity of a hydrocarbon, represents another embodiment of the invention. The process comprises the step of combining a starting volume of supercritical $CO_2$ or hydrocarbon solvent (or a combination of both) with a functionalized silicone polymer, as described herein. The viscosity of the combined material is greater than that of the starting volume of the material(s).

A process for the recovery of oil from a subterranean, oil-bearing formation is also an inventive embodiment. The process comprises the steps of a) injecting carbon dioxide into the formation through at least one injection well, under supercritical conditions; and b) recovering oil and injected carbon dioxide from a production well at a distance from the injection well;

wherein the viscosity of the carbon dioxide within the formation is controlled by dissolving a silicone polymer into the carbon dioxide under supercritical conditions, in an amount sufficient to modify the viscosity of the supercritical $CO_2$ to a desired level; and wherein the silicone polymer contains least one functional group, as described herein.

A process for extracting natural gas or oil, or a combination of natural gas and oil, from a bedrock-shale formation, is yet another embodiment. The process comprises the following steps:

(i) drilling a well into the bedrock-shale formation; and (ii) injecting a fracking fluid under high pressure into the formation via the well;

wherein the fracking fluid comprises water, proppant, supercritical $CO_2$; and a silicone polymer that comprises at least one functional group, as described herein, in an amount sufficient to modify the viscosity of the fracking fluid.

BRIEF DESCRIPTION OF THE DRAWING

FIG. 1 is a graph depicting viscosity characteristics for various compositions disclosed herein.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the term "solvent" can refer to a single solvent or a mixture of solvents, unless otherwise indicated. Moreover, the term "aliphatic radical" refers to an organic radical having a valence of at least 1, including a linear or branched array of atoms. Aliphatic radicals are defined to comprise at least one carbon atom.

The array of atoms comprising the aliphatic radical may include heteroatoms such as nitrogen, sulfur, silicon, selenium and oxygen, or may be composed exclusively of carbon and hydrogen. For convenience, the term "aliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. Many other examples of aliphatic groups and compounds are set forth in various references, including U.S. Pat. No. 8,747,694 (Perry et al), incorporated herein by reference.

A variety of silicone polymers can be used for embodiments of this invention. Many are often referred to as polymerized siloxanes or polysiloxanes, and have the general, chemical formula $[R_2SiO]_n$, wherein R comprises a linear, branched or aromatic organic group of any number of carbons, e.g., methyl, ethyl, phenyl, etc. These materials thus comprise an inorganic silicon-oxygen backbone ( . . . Si—O—Si—O—Si—O— . . . ), with organic side groups attached to the silicon atoms, which are four-coordinate. These silicones may be linear, with R and OR' end-capping groups; or may be cyclic in structure, containing only the repeating units. Branched silicones can also be used. The silicones are typically low cost, and stable at high temperatures, e.g., up to about 150° C. Silicones are also readily functionalized, and so, can be functionalized with groups that increase their affinity for $CO_2$.

The siloxane can also be represented as the following structure $$M_aD_bT_cQ_d, \quad \text{(I)},$$

wherein

M has the formula $R^1{}_3SiO_{1/2}$;

D has the formula $R^2R^3SiO_{2/2}$;

T has the formula $R^4SiO_{3/2}$;

Q has the formula $SiO_{4/2}$;

and wherein each of $R^1$, $R^2$, $R^3$, and $R^4$ is independently $C_1$-$C_5$ alkyl, and a=2-10, b=15-500, c=0-10 and d=0-10.

Various siloxane copolymers can also be used. In some embodiments, the siloxane has the structure (II)

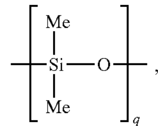

wherein q is an integer from 1 to about 500. This structure is based on polydimethysiloxane (PDMS), a well-known silicone-based organic polymer. Other general information regarding silicones and various siloxane polymers can be found in a variety of references, such as U.S. Pat. No. 6,054,547 (Perry et al) and U.S. Pat. No. 7,241,835 (O'Brien et al), both incorporated herein by reference.

As mentioned above, the selected silicone polymer comprises at least one functional group selected from anthraquinone amide groups; anthraquinone sulfonamide groups; thioxanthone amide groups; or thioxanthone sulfone amide groups. The base materials are known in the art. For example, various thioxanthone compounds are described in U.S. Pat. No. 5,414,092 (W. Green et al), incorporated by reference. Anthraquinone compounds are also described in many patents and other references, including U.S. Pat. No. 5,746,779 (K. Brown), incorporated herein by reference.

In most preferred embodiments, the functional group for the silicone polymer can be represented by the formula (III)

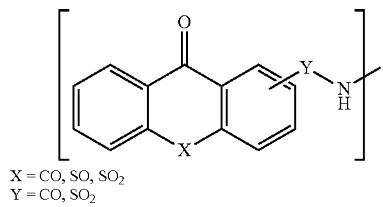

wherein "X" can be CO, SO, or $SO_2$; and "Y" can represent CO or $SO_2$. These materials are anthraquinone amides when X and Y are CO (i.e., carbonyl). When X is $SO_2$ and Y is CO, the material is a thioxanthone sulfone amide. In the case of X being SO (sulfur monoxide) and Y being CO, compound (I) represents a thioxanthone sulfoxide amide, which is another type of oxidized thioxanthone derivative. Moreover, when Y is $SO_2$, each of the respective amide compounds becomes the corresponding sulfonamide compound.

Many of the preferred anthraquinone functional groups can be expressed by the following formula (IV)

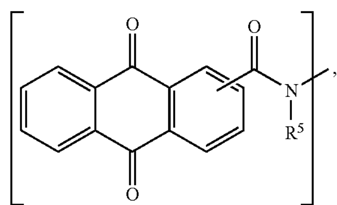

wherein $R^5$ is a $C_1$-$C_5$ alkyl group, or hydrogen.

The preferred thioxanthone amide functional groups comprise structure V (V)

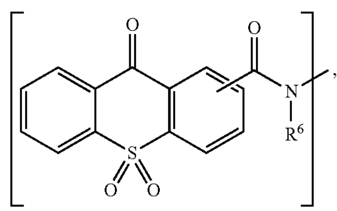

wherein $R^6$ is a $C_1$-$C_5$ alkyl group, or hydrogen.

A choice of which functionalized silicone polymer is most suitable, e.g., anthraquinone-based materials versus thioxanthone-based materials, will depend in part on solubility and miscibility considerations. For example, some of the functionalized polymers may exhibit greater solubility in supercritical carbon dioxide; whereas other functionalized polymers are especially effective in gelling various hydrocarbons such as hexane.

The functional group (or multiple functional groups) can be attached to the silicone polymer as an end group, i.e., terminating one or more sites on the polymer. Alternatively, the functional group can be attached to another site on the polymer. For example, one or more functional groups could be incorporated as pendant groups extending from another portion of the silicone chain.

The general ratio between the siloxane portion of the polymer and the anthraquinone/thioxanthone functional groups can be important, in terms of solubilizing the polymer in a selected solvent for a given end use. In the case of supercritical $CO_2$ solvent, the ratio of siloxane groups (e.g., the number of siloxane repeating structures in formula I) to the total number of anthraquinone/thioxanthone groups, should be sufficient to solubilize the polymer, at a temperature within the range of about 30° C. to about 200° C., and at a pressure within the range of about 1100-10,000 psi. The preferred temperature range for full solubility should be about 35° C. to about 150° C.; and most preferably, about 40° C. to about 120° C.

The relative amounts of siloxane and functional groups can conveniently be expressed in terms of weight. For example, in some preferred embodiments for use with a supercritical $CO_2$ solvent, the total amount of functional groups should often be less than about 30% by weight of the weight of the overall silicone polymer. In some specific amounts, the level is in the range of about 5% to about 15% by weight.

In many preferred applications involving oil recovery or hydrofracking, the functionalized silicone polymer of this invention is combined with at least one hydrocarbon solvent. This combination can effectively solubilize and thicken a material like supercritical $CO_2$, by increasing the viscosity of the hydrocarbon component. A number of solvents can be used for this combination. Non-limiting examples include pentane, hexane, heptane, toluene, xylene, and mesitylene.

The amount of modified silicone polymer used with the hydrocarbon solvent will depend on a number of factors, such as the desired viscosity of the combined material, the boiling point of the solvent; the pressure at which the silicone/solvent material is to be used in a given process; and the solubility of the silicone polymer in the solvent.

In some embodiments, the functionalized silicone polymer is present in an amount sufficient to raise the viscosity of the hydrocarbon solvent by at least about two times (2×) its viscosity at room temperature and atmospheric pressure. This assumes the silicone/solvent combination will be used at a temperature in the range of about 0° C. to about 140° C.; and a pressure in the range of about atmospheric pressure to about 10,000 psi. The use of the functionalized silicone polymer described herein as a very effective thickening agent for a hydrocarbon material like hexane (i.e., n-hexane and any isomers of hexane) represents one key inventive concept of this disclosure.

In other embodiments, the amount of functionalized silicone polymer present should be sufficient to transform the hydrocarbon solvent to a gel, at selected temperature and pressure conditions. As used herein, a "gel" is generally defined as a solid or semi-solid, jelly-like material. Gels for the purpose of this invention are usually substantially dilute, cross-linked materials which exhibit no flow in the steady state. It should be apparent from the discussion herein that an embodiment of this invention is directed to a thickening agent (or in some cases, a gellant) for organic liquid compositions or supercritical fluids, based on the modified silicone polymer described herein.

Another embodiment of the invention is a process for increasing the viscosity of supercritical $CO_2$, e.g., an increase of at least about two times (2×) its viscosity at room temperature and atmospheric pressure. The process includes the step of combining a starting volume of supercritical $CO_2$ with the modified silicone polymer described herein. As mentioned previously, the modified silicone is often used in conjunction with a co-solvent, e.g., a hydrocarbon co-solvent. In some embodiments, the co-solvent and modified silicone can be pre-mixed in a suitable tank by any conventional mixing technique, such as a static mixer. The mixture can then be combined with the supercritical $CO_2$ in another vessel, and/or within a series of pump-aided conduits. The amount of modified silicone/co-solvent used is one that is sufficient to increase the viscosity of a volume of the supercritical $CO_2$ to a desired level, for a given end use. (In many cases, a co-solvent may not be necessary if the materials are combined at elevated temperatures, e.g., above the melting point of the modified silicone polymers).

Yet another embodiment of the invention, mentioned above, relates to a process for recovering oil from a subterranean, oil-bearing formation. As those skilled in the art understand, there is a great need for better ways to carry out "tertiary" phase techniques for recovering oil, i.e., EOR techniques. In the present embodiment, supercritical carbon dioxide is injected into an oil wellbore or other appropriate injection site within an oil field. However, unlike other conventional, tertiary gas injection techniques, the viscosity of the supercritical $CO_2$ that is being injected has been selectively adjusted by dissolving a specially-modified silicone polymer therein, as described in detail previously. As also noted above, the modified polymer is typically used with an appropriate co-solvent.

Particular details for combining the supercritical $CO_2$ with the modified silicone and co-solvent are not generally critical to this inventive concept. Moreover, the general details regarding gas injection into an oil wellbore are also known in the art. They are described in a variety of patents, patent applications, and academic and industrial periodicals (hard copy and electronic), e.g., "Enhanced Oil Recovery: Maximizing Our Petroleum Resources", Jacob Chrastina et al, Session A13-Chemical Engineering Topics 2; pp. 2337 et seq; pitt.edu (available online as of Mar. 2, 2015).

Furthermore, government sources provide additional review and instruction. As an example, the U.S. Department of Energy's Office of Fossil Energy provides an extensive review of all types of enhanced oil recovery techniques. Similar instructive techniques are provided in literature from the National Energy Technology Laboratory.

As alluded to above, the thickened supercritical $CO_2$ (or supercritical $CO_2$/solvent system) can more efficiently displace and sweep (i.e., "push") residual oil along a given subterranean pathway within an oil field. This in contrast to the use of supercritical $CO_2$ by itself, or in combination with less effective solvents. In those instances, the supercritical carbon dioxide component tends to "finger" around or through the oil, rather than forcing greater amounts of the oil itself to move through to a production wellbore. The presently-described embodiments should also greatly decrease or eliminate the amount of water needed in an EOR technique, e.g., as part of a WAG process which can use large amounts of water—usually in alternating stages.

Still another embodiment of the invention is directed to hydraulic fracturing processes and materials, e.g., for extracting natural gas or oil, or a combination of natural gas and oil, from a bedrock-shale formation. As mentioned above, hydraulic fracturing or "fracking" typically uses large amounts of water that is injected into oil or gas wells under high pressure. The water helps to free the gas or oil from the shale deposits, and this technique is a form of well-stimulation.

Certainly, the requirement for water is a difficult one, in those cases where large shale gas deposits are found in deserts. Carbon dioxide fracking is an alternative extractant that is currently in use, e.g., in Wyoming, where carbon dioxide pipelines have been constructed. However, as also described previously, supercritical $CO_2$ has very low viscosity, and, by itself, will usually result in fractures that are smaller and thinner than those attained with higher-viscosity fluids. The supercritical $CO_2$ will also have difficulty in transporting high concentrations of large proppant particles into the fractures.

In these inventive embodiments, at least one well is drilled into a selected bedrock-shale formation. Techniques for drilling wells intended for hydraulic fracturing are well-known in the art, as are general fracturing techniques. A non-limiting example is U.S. Pat. No. 8,529,155 (DiTommaso et al), incorporated herein by reference.

In the present instance, the fracking fluid used for this process usually comprises some amount of water, along with hydrofracturing proppant, supercritical $CO_2$; and the modified silicone polymer described herein (which may be preblended with the supercritical $CO_2$). The fluid composition may further include at least one co-solvent, e.g., a hydrocarbon solvent as discussed above.

According to conventional techniques, the fracking fluid is injected under high pressure into the shale formation, through a well-head. Those skilled in the art are familiar with factors that influence both the injection rate for the fluid, and the pressure used. In some cases, the pressure can approach about 15,000 psi; while the injection rate can be as high as about 265 liters per second, or 100 barrels per minute.

The use of the modified silicone polymer can increase the viscosity of the supercritical $CO_2$, as described previously. The overall fracking fluid then becomes thicker, and has the ability to more efficiently fracture rock within the shale formation, thereby releasing more oil and gas, which can be directed to the well surface. Moreover, the need for large amounts of water is minimized or eliminated. Furthermore, the silicone material used herein may be more environmentally benign than some of the other fracking components used in the prior art, like acrylates and acrylamides.

EXAMPLES

The following examples illustrate methods and embodiments in accordance with the invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Example 1

Synthesis of Linear, Anthraquinone Amide Terminated PDMS ($M'D_{30}M'$)

Anthraquinone allyl amide (0.25 g, 0.86 mmol) was mixed with toluene (5 mL) and the hazy mixture was heated to ~50° C. $M^HD_{30}M^H$ (1.0 g, 0.85 mmol) in toluene (2 mL) was then added, followed by a drop of Karstedt's catalyst. Heating was continued up to 80° C. As the reaction proceeded, the mixture clarified. After a few hours, proton NMR indicated that the allyl amide was consumed but there was a small amount of SiH remaining Thus a small amount of additional anthraquinone allyl amide was added. After 30 minutes, the solvent was removed on a rotary evaporator yielding essentially a quantitative yield of product as a brown oil that solidified on cooling to a rubbery material. $^1H$ NMR ($CDCl_3$) δ: 8.56 (s, 2H); 8.25-8.38 (m, 8H); 7.83 (m, 4H); 6.5-7.2 (m, 2H); 3.53 (br q, J=6.4 Hz, 4H); 1.73 (m, 4H); 0.66 (m, 4H); 0.03-0.17 (m, 271H). $^{13}C\{^1H\}$ NMR ($CDCl_3$): 182.28, 182.22, 165.64, 139.84, 134.84, 134.30, 134.24, 133.23, 133.06, 127.69, 127.25, 124.87, 43.33, 23.56, 15.55, 1.37, 1.17, 1.00, 0.82, 0.63, 0.13 ppm.

Example 2

Synthesis of Anthraquinone Amide Based Copolymer-1

Anthraquinone allyl amide (1.71 g, 5.9 mmol) was mixed with toluene (20 mL) and heated to 90° C. under nitrogen. To the hazy solution was added one drop of Karstedt's catalyst followed by a hydride fluid with average composition $M^HD_{20}D^H{}_2M^H$ (5.0 g, 10.4 mmol). Within a few minutes the mixture clarified. After another 30 minutes, allylated PPG (5.00 g, 4.8 mmols) was added. The mixture was then allowed to react overnight. NMR at this point showed that there was still about 10% SiH left. Therefore a little more allylated PPG (0.50 g) was added and the oil bath temperature was turned up to 110° C. After 2 hours the reaction mixture was carefully placed under vacuum and the bulk of the toluene was stripped off. The mixture was cooled some, diluted with chloroform and the solvents removed on a rotary evaporator. The result was 11.89 g of product (97%) as a very viscous oil that solidified on cooling to a hazy orange gel. The melting behavior of this material was evaluated using differential scanning calorimetry (DSC, Perkin-Elmer DSC7, heating rate of 10° C./min). The melting endotherm exhibited an Onset Temperature of 44.20° C., a Peak Temperature of 55.73° C. and a Delta H of 3.8997 J/g. $^{1}$H NMR ($CDCl_3$) δ: 7.5-8.6 (m, 17H), 3.25-3.75 (m, 131H), 1.3-1.9 (m, 18H), 1.13 (br s, 119H), 0.90 (t, J=7.2 Hz, 5.9H), 0.63 (m, 4.5H), 0.49 (m, 3.4H), 0.06 (br s, 167H). $^{13}$C{$^{1}$H} NMR ($CDCl_3$): 182.34, 182.28, 165.50, 139.80, 134.89, 134.33, 134.28, 134.10, 127.73, 127.68, 127.28, 127.11, 124.88, 75.47, 75.33, 75.29, 75.20, 75.09, 74.99, 74.75, 74.73, 74.70, 74.66, 73.33, 72.95, 72.92, 72.88, 72.84, 72.16, 43.28, 31.74, 23.85, 23.58, 23.53, 19.26, 17.52, 17.42, 17.30, 17.21, 15.52, 14.14, 13.88, 13.43, 1.15, 0.99, 0.11, 0.08, −0.62 ppm.

Example 3

Synthesis of Anthraquinone Amide Based Copolymer-2

Hydride fluid $M^{H}D_{70}D^{H}_{7}M^{H}$ (10.0 g, 15.7 mmol SiH), solid allyl anthraquinone-2-carboxamide (2.0 g, 6.9 mmol) and toluene (50 mL) were combined and heated to 90-95° C. under nitrogen. A drop of Karstedt's catalyst in toluene (1 mL) was then added. The result was stirred for approximately 15-20 minutes during which time all of the allyl anthraquinone-2-carboxamide went into solution. After another 20 minutes, allyl acetate (1.0 g, 10 mmol) was added. After another 50 minutes, a small sample was removed, stripped on a rotary evaporator, and analyzed by proton NMR. This showed the reaction to be complete. Therefore, the toluene and excess allyl acetate were removed under vacuum. The result was 11.7 g of product as a rubbery yellow solid. The melting behavior of this material was evaluated using differential scanning calorimetry (DSC, Perkin-Elmer DSC7, heating rate of 10° C./min). A trimodal endotherm was observed. The main melting endotherm exhibited an Onset Temperature of 42.47° C., a Peak Temperature of 48.93° C. and a Delta H of 1.8082 J/g. The other two endotherms peaked at ~61° C. and 67° C. $^{1}$H NMR ($CDCl_3$) δ: 7.6-8.7 (m, 39H), 6.6 (br s), 4.02 (t, J=7.0 Hz, 7H), 3.52 (br q, J=6.4 Hz, 11H), 1.99-2.02 (m, 19H), 1.6-1.9 (m, 23H), 0.66 (m, 11H), 0.54 (m, 7H), 0.01-0.16 (m, 715H). 13C {1H} NMR ($CDCl_3$): 182.48, 182.39, 170.02, 165.53, 139.80, 135.02, 134.35, 134.14, 133.39, 133.15, 127.87, 127.76, 124.78, 66.82, 43.30, 23.57, 23.26, 22.69, 22.28, 20.92, 15.53, 13.33, 1.39, 1.18, 1.12, 1.01, 0.84, 0.72, 0.69, 0.64, 0.13, −0.62, −3.00 ppm.

Example 4

Synthesis of Anthraquinone Amide Branched Polymer-1

A branched aminosilicone with average composition $M'_{4}D_{80}T_{3.5}$ (23.0 g, 13.8 mmol $NH_2$) was dissolved in chloroform (65 mL) under nitrogen. Next, triethylamine (2.5 mL, 17.9 mmol) was added followed by anthraquinone-2-carbonyl chloride (3.73 g, 13.8 mmol). After stirring overnight, hexanes (90 mL) and Celite (3 g) were added and the mixture was filtered. There appeared to be a little bit of gel on the walls of the filter flask, so a little more Celite (~2 g) was added and the mix was refiltered. The resulting solution was then stripped on a rotary evaporator. The result was 27.9 g of a slightly hazy material. Therefore it was dissolved in chloroform and washed twice with DI water. The phase separations took some time to finish (there was a stubbornly persistent rag layer in the top water phase). After drying over potassium carbonate, the solvent was then removed on a rotary evaporator yielding 24.3 g of product as a yellow oil that solidified on cooling to a clear yellow rubbery material. $^{1}$H NMR ($CDCl_3$) δ: 8.57 (s, 4H); 8.25-8.40 (m, 16H); 7.83 (m, 8H); 6.5-7.2 (m, 4H); 3.76 (q, J=6.8 Hz, 0.78H residual ethoxy); 3.53 q, J=6.4 Hz, 8H); 1.73 (m, 8H); 1.22 (t, J=6.8 Hz, 1.29H, residual ethoxy); 0.66 (m, 8H); 0.07-0.15 (m, 569H). $^{13}$C {$^{1}$H} NMR ($CDCl_3$): 182.51, 182.41, 165.49, 139.80, 135.03, 134.43, 134.36, 133.40, 133.36, 133.16, 127.89, 127.39, 124.76, 43.30, 23.59, 15.54, 1.39, 1.20, 1.02, 0.93, 0.85, 0.83, 0.79, 0.69, 0.65, 0.56, 0.14 ppm.

Example 5

Synthesis of Anthraquinone Amide Branched Polymer-2

A branched aminosilicone of average composition $M'_{4}D_{88}T_{3.5}$ (10.0 g, 5.5 mmol $NH_2$) was dissolved in chloroform (30 mL) under nitrogen. Next, triethylamine (1.0 mL, 7.2 mmol) was added followed by anthraquinone-2-carbonyl chloride (1.50 g, 5.5 mmol). After stirring overnight, the reaction mixture was diluted with hexanes (45 mL) and filtered into a separatory funnel. The resulting solution was washed twice with DI water and once with saturated sodium chloride. After drying over anhydrous potassium carbonate, the solvents were removed on a rotary evaporator to yield 10.48 g (93%) of a yellow oil that solidified to a rubbery solid on cooling to room temperature. The melting behavior of this material was evaluated using differential scanning calorimetry (DSC, Perkin-Elmer DSC7, heating rate of 10° C./min). The melting endotherm exhibited an Onset Temperature of 34.14° C., a Peak Temperature of 46.53° C. and a Delta H of 3.2400 J/g. $^{1}$H NMR ($CDCl_3$) δ: 8.57 (s, 4H); 8.25-8.40 (m, 16H); 7.83 (m, 8H); 6.6 (br s); 3.53 (q, J=6.4 Hz, 8H); 1.74 (m, 8H); 0.66 (m, 8H); 0.05-0.16 (m, 636H). $^{13}$C{$^{1}$H} NMR ($CDCl_3$): 182.49, 182.40, 165.49, 139.80, 135.02, 134.43, 134.35, 133.39, 133.36, 133.16, 127.89, 127.38, 124.77, 43.30, 23.59, 15.54, 1.39, 1.20, 1.02, 0.93, 0.85, 0.74, 0.14, −2.30 ppm.

Comparative Example 6

Synthesis of Fluorenone Amide Branched Polymer

A branched aminosilicone of average composition $M'_{4}D_{88}T_{3.5}$ (10.0 g, 5.5 mmol $NH_2$) was dissolved in THF (30 mL) under nitrogen. Next, triethylamine (1.0 mL, 7.2 mmol) was added followed by fluorenone-2-carbonyl chloride (1.33 g, 5.5 mmol). After a couple of hours proton NMR showed the reaction to be complete. Therefore the solids were removed by filtration and then the THF was stripped off on the rotary evaporator. The residue was dissolved in chloroform and washed with water. After drying over anhydrous potassium carbonate, the solvent was removed on a rotary evaporator. The result was 10.02 g of product as a hazy yellow, rubbery solid. The melting behavior of this material was evaluated using differential scanning calorimetry (DSC, Perkin-Elmer DSC7, heating rate of 10° C./min).

A multi-modal endotherm in the 40-75° C. range was observed. The largest peak had an Onset Temperature of 70.80° C. and a Peak Temperature of 71.60° C. The delta H was 4.268 J/g. $^1$H NMR ($CDCl_3$) δ: 8.08 (d, J=7.6 Hz, 4H), 7.95 (s, 4H), 7.69 (d, J=7.2 Hz, 4H), 7.57 (m, 12H), 7.36 (t, J=7.4 Hz, 4H), 6.4 (br s), 3.49 (q, J=6.4 Hz, 8H), 1.70 (m, 8H), 0.65 (m, 8H), 0.02-0.20 (m, 581H). $^{13}C\{^1H\}$ NMR ($CDCl_3$): 192.89, 166.01, 146.95, 143.53, 135.57, 134.97, 134.60, 134.57, 134.14, 129.82, 124.54, 121.71, 120.96, 120.51, 43.11, 23.59, 15.53, 1.39, 1.18, 1.01, 0.93, 0.84, 0.64, 0.55, 0.13, −2.31 ppm.

Comparative Example 7

Synthesis of Pyrene Amide Branched Polymer

A branched aminosilicone of average composition $M'_4D_{88}T_{3.5}$ (10.0 g, 5.5 mmol $NH_2$) was dissolved in THF (30 mL) under nitrogen. Next, triethylamine (1.0 mL, 7.2 mmol) was added followed by pyrene-1-carbonyl chloride (1.46 g, 5.5 mmol). After a couple of hours the reaction mixture was filtered to remove solids and the THF was removed on a rotary evaporator. The residue was dissolved in chloroform and the result was washed twice with water and once with saturated sodium chloride. After drying over anhydrous potassium carbonate the solvent was removed under reduced pressure. The result was 9.92 g of product as a viscous, hazy yellow oil. $^1$H NMR ($CDCl_3$) δ: 7.9-8.6 (m, 36H), 6.29 (br s), 3.63 (m, 8H), 1.79 (m, 8H), 0.73 (m, 8H), 0.09-0.19 (m, 596H). $^{13}C\{^1H\}$ NMR ($CDCl_3$): 169.94, 132.38, 131.47, 131.16, 130.72, 130.68, 128.56, 128.51, 128.49, 127.09, 126.27, 125.73, 125.65, 124.45, 124.41, 124.27, 124.21, 43.19, 23.75, 15.59, 1.41, 1.21, 1.11, 1.04, 0.96, 0.86, 0.75, 0.66, 0.58, 0.18, −2.29 ppm.

Example 8

Ability to Gel Hexanes

A portion of the compounds above were combined with hexanes at the 10 weight percent level. The mixtures were heated to disperse the materials and then allowed to cool. On cooling the anthraquinone amide based materials from Examples 1-5 formed gels while the hexane blends with the two comparative examples (6 & 7) remained low viscosity liquids.

Example 9

Synthesis of Thioxanthone-10,10-Dioxide Amide Branched Polymer

Thioxanthone-10,10-dioxide-2-carboxylic acid (1.8 g, 6.2 mmol) was combined with thionyl chloride (10 mL, 137 mmol) and a small amount of pyridine (0.1 g) and heated to reflux under nitrogen for 1.5 hours. At this point, the excess thionyl chloride was removed on a rotary evaporator. Petroleum ether (20 mL) was added and this was removed on the rotary evaporator as well. The solid acid chloride was then mixed with THF (30 mL) and stirred under nitrogen. A solution of branched aminosilicone with average composition $M'_4D_{88}T_{3.5}$ (11.35 g, 6.2 mmol $NH_2$) and triethylamine (1.2 mL, 8.6 mmol) in THF (20 mL) was then added. After stirring overnight, the reaction mixture was filtered and the clear filtrate was stripped on the rotary evaporator. The residue was then dissolved in chloroform and the resulting solution was washed twice with deionized water. After drying over anhydrous potassium carbonate, the chloroform was removed under reduced pressure yielding 11.77 g (89.8% yield) of product as a clear-orange, rubbery solid. The melting behavior of this material was evaluated using differential scanning calorimetry (DSC, Perkin-Elmer DSC7, heating rate of 10° C./min). The melting endotherm exhibited an Onset Temperature of 54.33° C., a Peak Temperature of 63.87° C. and a Delta H of 3.3491 J/g. $^1$H NMR ($CDCl_3$) δ: 8.60 (s, 4H), 8.33 (m, 8H), 8.19 (m, 8H), 7.90 (m, 4H), 7.81 (m, 4H), 6.75 (br s, NHs), 3.50 (m, 8H), 1.72 (m, 8H), 0.65 (m, 8H), 0.04-0.16 (m, 590H). $^{13}C\{^1H\}$ NMR ($CDCl_3$): 177.71, 164.59, 142.70, 140.76, 139.33, 134.91, 133.62, 133.41, 130.64, 130.40, 129.28, 126.90, 124.13, 123.60, 43.37, 23.51, 15.53, 1.37, 1.18, 1.00, 0.92, 0.83, 0.72, 0.64, 0.54, 0.13, −2.32 ppm.

Example 10

Synthesis of Thioxanthone-10,10-Dioxide Amide Linear Polymer

Thioxanthone-10,10-dioxide-2-carboxylic acid (0.48 g, 1.7 mmol) was combined with thionyl chloride (3 mL, 41 mmol) and a small amount of pyridine (2 drops) and heated to reflux under nitrogen for 2 hours. The excess thionyl chloride was removed under vacuum on a rotary evaporator, then a few mLs of petroleum ether was added and this was evaporated off as well. The resulting solid residue was cooled to room temperature and mixed with THF (6 mL) under nitrogen. A solution of Gelest DMS-A15 (2.5 g, 1.7 mmol) and trimethylamine (0.3 mL, 2.2 mmol) in THF (4 mL) was then added. After stirring 2 hours, a small amount of Celite was added and the mixture was filtered to remove solids. The THF was then removed under vacuum and the residue thus obtained was dissolved in chloroform. The solution was washed twice with deionized water and once with saturated sodium chloride. After drying over anhydrous potassium carbonate, the chloroform was removed under reduced pressure on a rotary evaporator. The result was 2.52 g (85% yield) product as a yellow rubbery solid. $^1$H NMR ($CDCl_3$) δ: 8.61 (s, 2H), 8.34 (t, J=7.4 Hz, 4H), 8.22 (d, J=8.0 Hz, 2H), 8.18 (d, J=8.0 Hz, 2H), 7.91 (t, J=7.6 Hz, 2H), 7.82 (t, J=7.6 Hz, 2H), 6.71 (br s, NHs), 3.51 (q, J=6.8 Hz, 4H), 1.72 (m, 4H), 0.65 (m, 4H), 0.05-0.16 (m, 277H). $^{13}C\{^1H\}$ NMR ($CDCl_3$): 177.76, 164.61, 142.74, 140.77, 139.31, 134.93, 133.64, 133.42, 130.66, 130.40, 129.30, 126.87, 124.17, 123.62, 43.38, 23.51, 15.53, 1.38, 1.19, 1.08, 1.01, 0.64, 0.13 ppm.

Example 11

Synthesis of Silicone with Pendant Anthraquinone Amides (120)

An aminopropyl functional silicone with general composition MD30D'SM (3.0 g, 5.0 mmols NH2) was dissolved in THF (10 mL) under nitrogen. Triethylamine (0.8 mL, 5.7 mmol) was added followed by anthraquinone-2-carbonyl chloride (1.37 g, 5.0 mmol). The result was allowed to stir overnight at room temperature. At this point, the mixture was filtered to remove solids. The THF was then removed under vacuum and the residue thus obtained was dissolved in chloroform. The solution was washed twice with deionized water and once with saturated sodium chloride. After drying over anhydrous potassium carbonate, the chloroform was removed under reduced pressure on a rotary evaporator. The result was 3.45 g (82% yield) of product as a yellow solid. $^1$H NMR ($CDCl_3$) δ: 7.5-8.6 (br m, 38H), 3.53 (m, 10H), 1.70-1.89 (m, 10H), 0.66 (m, 10H), 0.03-0.18 (m, 203H).

Gelation of Hexanes

The compounds from Examples 9, 10, and 11 all gelled hexanes at a concentration of 2-3 weight percent.

Example 12

Gelation/Viscosity Testing for Composition of Example 3

The gellant composition described in Example 3 was combined with hexane and $CO_2$ in the following mass ratio: 113% gellant, 26.6% hexane, 60% $CO_2$. A single phase was attained at 25° C. and pressures above 3000 psi, only after the high pressure mixture was heated to 60° C. psi and then allowed to cool to 25° C., at high pressure. High pressure, close clearance, windowed, falling ball viscometry indicated that the viscosity of this fluid was 3.1 times greater than that of a mixture comprised of 40% hexane and 60% $CO_2$, at the same temperature and pressure.

Example 13

Gelation/Viscosity Testing for Composition of Example 4

The gellant composition described in Example 4 was combined with hexane and $CO_2$ in the following mass ratio: 16.67% gellant, 33.33% hexane, 50% $CO_2$. A single phase was attained at 25° C. and pressures above 3000 psi, only after the high pressure mixture was heated to 40° C. psi, and then allowed to cool to 25° C. at high pressure. High pressure, close clearance, windowed, falling ball viscometry indicated that the viscosity of this fluid was so great that the ball was unable to fall through the transparent fluid.

Example 14

Gelation/Viscosity Testing for Composition of Example 4

The gellant composition described in Example 4 was combined with hexane and $CO_2$ in the following mass ratio: 13.3% gellant, 26.6% hexane, 60% $CO_2$. A single phase was attained at 25° C. and pressures above 3000 psi, only after the high pressure mixture was heated to 60° C. psi, and then allowed to cool to 25° C. at high pressure. High pressure, close clearance, windowed, falling ball viscometry indicated that the viscosity of this fluid was 9.2 times greater than that of a mixture comprised of 40% hexane and 60% $CO_2$ at the same temperature and pressure.

Example 15

Gelation/Viscosity Testing for Composition of Example 4

The gellant composition described in Example 4 was combined with hexane and $CO_2$ in the following mass ratio: 10% gellant, 20% hexane, 70% $CO_2$. A single phase was attained at 25° C. and pressures above 8200 psi, only after the high pressure mixture was heated to 60° C. and then allowed to cool to 25° C. at high pressure. High pressure, close clearance, windowed, falling ball viscometry indicated that the viscosity of this fluid was 5.8 times greater than that of a mixture comprised of 30% hexane and 70% $CO_2$ at the same temperature and pressure.

Example 16

Gelation/Viscosity Testing for Composition of Example 5

The gellant composition described in Example 5, was combined with hexane and $CO_2$ in the following mass ratio: 16.67% gellant, 33.33% hexane, 50% $CO_2$. A stable emulsion with no signs of phase separation was attained at 25° C. and pressures above 5000 psi. High pressure, close clearance, windowed, falling ball viscometry indicated that the viscosity of this fluid was 8 times greater than that of a mixture comprised of 50% hexane and 50% $CO_2$, at the same temperature and pressure.

Example 17

Gelation/Viscosity Testing for Composition of Example 5

The gellant composition described in Example 5 was combined with hexane and $CO_2$ in the following mass ratio: 13.3% gellant, 26.6% hexane, 60% $CO_2$. stable emulsion with no signs of phase separation was attained at 25° C. and pressures above 7000 psi, only after the high pressure mixture was heated to 40° C. psi and then allowed to cool to 25° C. at high pressure. High pressure, close clearance, windowed, falling ball viscometry indicated that the viscosity of this fluid was 3.5 times greater than that of a mixture comprised of 40% hexane and 60% $CO_2$, at the same temperature and pressure.

Example 18

Gelation/Viscosity Testing for Composition of Example 5

The gellant composition described in Example 5 was combined with hexane and $CO_2$ in the following mass ratio: 10% gellant, 20% hexane, 60% $CO_2$. A stable emulsion with no signs of phase separation was attained at 25° C. and pressures above 7000 psi, only after the high pressure mixture was heated to 40° C. psi and then allowed to cool to 25° C., at high pressure. High pressure, close clearance, windowed, falling ball viscometry indicated that the viscosity of this fluid was 2.7 times greater than that of a mixture comprised of 30% hexane and 70% $CO_2$ at the same temperature and pressure.

FIG. 1 is a graph depicting viscosity characteristics for several of the compositions described in the present invention, with the viscosity of the supercritical $CO_2$ compositions, with or without a thickening agent, measured as a function of the concentration of the thickening agent. The testing of samples 3, 4 and 5 resulted in the curves in the graph. (Curve 3 includes only one data point). The curves collectively demonstrate that the thickening agents successfully increased the viscosity of supercritical $CO_2$. In the case of sample 4, the viscosity of the supercritical $CO_2$ increased to the point at which the falling ball in the viscometry test was stopped entirely. The sample 5 compositions also exhibited a desirable increase in viscosity, although not quite as efficiently as with samples 4.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A polysiloxane having repeating units of the formula:

$[R_2SiO]$ wherein R is a linear, branched or aromatic organic group, and wherein the polysiloxane has one or more end groups comprising a functional group selected from anthraquinone amide groups; anthraquinone sulfonamide groups; thioxanthone amide groups; or thioxanthone sulfone amide groups.

2. The polymer of claim 1, wherein the silicone polymer comprises a cyclical structure, a linear structure or a branched structure.

3. The polysiloxane of claim 1, wherein the polysiloxane is a copolymer.

4. The polysiloxane of claim 1, wherein the anthraquinone amide functional groups comprise structure II (II)

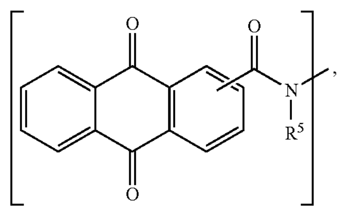

wherein $R^5$ is $C_1$-$C_5$ alkyl, or hydrogen.

5. The polysiloxane of claim 1, wherein the thioxanthone amide functional groups comprise structure III (III)

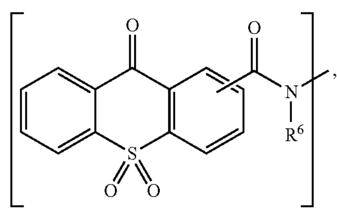

wherein $R^6$ is $C_1$-$C_5$ alkyl, or hydrogen.

6. The polysiloxane of claim 1, wherein the ratio of the siloxane repeating units to the functional groups (total) is sufficient to solubilize the polysiloxane in supercritical carbon dioxide ($CO_2$), at a temperature within the range of about 30° C. to about 200° C.; under a pressure within the range of about 1100 psi to about 10,000 psi.

7. The polysiloxane of claim 1, wherein R is methyl.

8. A combination of the polysiloxane of claim 1 with a hydrocarbon solvent containing about 2 to 20 carbon atoms.

9. The combination of claim 8, wherein the amount of the polysiloxane is sufficient to raise the viscosity of the hydrocarbon solvent by at least about two times (2×) its viscosity at room temperature and atmospheric pressure.

10. The combination of claim 8, wherein the hydrocarbon solvent is selected from the group consisting of pentane, hexane, heptane, toluene, xylene, and mesitylene.

11. A mixture of hexane and the polysiloxane of claim 1.

12. A composition comprising the combination of claim 8 with supercritical carbon dioxide ($CO_2$).

13. A thickening agent for organic liquid compositions comprising a silicone polymer having a silicon-oxygen backbone with organic side groups attached to silicon atoms in the backbone, wherein at least one of the organic side groups is a functional group selected from anthraquinone amide groups, anthraquinone sulfonamide groups, thioxanthone amide groups, or thioxanthone sulfone amide groups; and a hydrocarbon solvent containing about 2 to 20 carbon atoms.

14. A process for increasing the viscosity of supercritical $CO_2$, comprising the step of combining a starting volume of supercritical $CO_2$ with a silicone polymer that contains at least one functional group selected from anthraquinone amide groups; anthraquinone sulfonamide groups; thioxanthone amide groups; or thioxanthone sulfone amide groups, so that the viscosity of the supercritical $CO_2$ with the silicone polymer is greater than that of the starting volume of supercritical $CO_2$.

15. The process of claim 14, wherein at least one hydrocarbon solvent is combined with the silicone polymer, prior to combination of the polymer with the supercritical $CO_2$.

16. A process for the recovery of oil from a subterranean, oil-bearing formation, comprising the steps of a) injecting carbon dioxide into the formation through at least one injection well, under supercritical conditions; and b) recovering oil and injected carbon dioxide from a production well at a distance from the injection well;

wherein the viscosity of the carbon dioxide within the formation is controlled by dissolving a silicone polymer into the carbon dioxide under supercritical conditions, in an amount sufficient to modify the viscosity of the supercritical $CO_2$ to a desired level; and wherein the silicone polymer contains least one functional group selected from anthraquinone amide groups; anthraquinone sulfonamide groups; thioxanthone amide groups; or thioxanthone sulfone amide groups.

17. The process of claim 16, wherein at least one hydrocarbon solvent is pre-mixed with the silicone polymer, prior to dissolving the silicone polymer into the carbon dioxide.

18. A process for extracting natural gas or oil, or a combination of natural gas and oil, from a bedrock-shale formation, comprising the following steps:

(i) drilling a well into the bedrock-shale formation; and (ii) injecting a fracking fluid under high pressure into the formation via the well;

wherein the fracking fluid comprises water, proppant, supercritical $CO_2$; and a silicone polymer that comprises at least one functional group selected from anthraquinone amide groups; anthraquinone sulfonamide groups; thioxanthone amide groups; or thioxanthone sulfone amide groups; said silicone polymer being present in an amount sufficient to modify the viscosity of the fracking fluid.

19. The process of claim 18, wherein the fracking fluid further comprises at least one hydrocarbon solvent.

* * * * *